US010899649B2

(12) United States Patent
Tijerina Ramos

(10) Patent No.: US 10,899,649 B2
(45) Date of Patent: Jan. 26, 2021

(54) SYSTEM AND METHOD FOR COOLING MOULDS FOR A MACHINE USED TO FORM HOLLOW GLASS ITEMS

(71) Applicant: Vitro, S.A.B. de C.V., Garcia (MX)

(72) Inventor: Victor Tijerina Ramos, Monterrey (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 260 days.

(21) Appl. No.: 16/062,333

(22) PCT Filed: Dec. 15, 2015

(86) PCT No.: PCT/MX2015/000191
§ 371 (c)(1),
(2) Date: Jun. 14, 2018

(87) PCT Pub. No.: WO2017/105185
PCT Pub. Date: Jun. 22, 2017

(65) Prior Publication Data
US 2018/0362383 A1    Dec. 20, 2018

(51) Int. Cl.
*C03B 9/353* (2006.01)
*C03B 9/38* (2006.01)
*C03B 9/193* (2006.01)

(52) U.S. Cl.
CPC ............ *C03B 9/3891* (2013.01); *C03B 9/193* (2013.01); *C03B 9/1934* (2013.01);
(Continued)

(58) Field of Classification Search
CPC ......... C03B 9/353; C03B 9/38; C03B 9/3816; C03B 9/3883; C03B 9/3891
See application file for complete search history.

(56) References Cited

U.S. PATENT DOCUMENTS 1,875,202 A    8/1932    Aftergut
3,355,277 A   11/1967    Miller
(Continued)

FOREIGN PATENT DOCUMENTS

CN    102844277 A    12/2012
DE      3123488 C1   11/1982
(Continued)

*Primary Examiner* — Cynthia Szewczyk
(74) *Attorney, Agent, or Firm* — The Webb Law Firm

(57) ABSTRACT

The present invention relates to mold cooling method and system for a glass container forming machine that includes at least one mold holder including mold halves that are movable between a closed mold position for forming the glass article and an open mold position for releasing said article, each of the mold halves having axial passages for cooling each of the mold halves. A support structure having a fixed upper support section and a movable support section. Means for providing a cooling flow are coupled in coincidence with a series of openings in the movable support section. A cooling flow distributor located above the movable support section, the cooling flow distributor having a lower section in coincidence with each of the openings of the movable support section for the passage of the cooling flow and, a upper section in coincidence with each of the axial passages of each of the halves of each mold, the cooling flow distributor being movable between the closed mold position and the open mold position.

17 Claims, 12 Drawing Sheets

(52) U.S. Cl.
CPC .......... *C03B 9/1936* (2013.01); *C03B 9/3816* (2013.01); *C03B 9/3883* (2013.01)

(56) References Cited

U.S. PATENT DOCUMENTS

| | | | |
|---|---|---|---|
| 4,251,253 | A | 2/1981 | Becker et al. |
| 4,502,879 | A | 3/1985 | Foster |
| 4,561,875 | A | 12/1985 | Foster |
| 4,659,357 | A | 4/1987 | Doud |
| 4,701,202 | A | 10/1987 | Foster |
| 4,701,203 | A | 10/1987 | Schneider |
| 4,842,637 | A * | 6/1989 | Bolin .................. C03B 9/342 65/265 |
| 8,316,670 | B2 | 11/2012 | Newsom et al. |
| 2006/0179884 | A1 | 8/2006 | DiFrank et al. |
| 2007/0079634 | A1 | 4/2007 | Bewer et al. |
| 2011/0259054 | A1 | 10/2011 | Newsom et al. |
| 2014/0109619 | A1 | 4/2014 | Pontes et al. |

FOREIGN PATENT DOCUMENTS

| | | | |
|---|---|---|---|
| EP | 0612699 | A1 | 8/1994 |
| ES | 2083089 | | 1/1996 |
| ES | 2248176 | | 3/2006 |
| JP | 59064533 | A | 4/1984 |
| JP | 62119126 | A | 5/1987 |
| JP | 2007099617 | A | 4/2007 |
| JP | 2007516920 | A | 6/2007 |
| JP | 2013527109 | A | 6/2013 |
| JP | 2014084271 | A | 5/2014 |
| MX | 2012011682 | A | 12/2012 |
| RU | 2554648 | C2 | 5/2014 |
| WO | 2014156941 | A1 | 10/2014 |

* cited by examiner

SYSTEM AND METHOD FOR COOLING MOULDS FOR A MACHINE USED TO FORM HOLLOW GLASS ITEMS

CROSS-REFERENCE TO RELATED APPLICATION

This application is the United States national phase of International Application No. PCT/MX2015/000191 filed Dec. 15, 2015, the disclosure of which is hereby incorporated in its entirety by reference.

BACKGROUND OF THE INVENTION

Field of the Invention

The invention relates to the cooling of hot molds, and more specifically to a system and method for cooling the hot molds of glassware forming machines.

Description of the Related Art

The high production speeds of quality glassware, such as glass containers, require that the molds are cooled in a controlled manner on the parison forming side and, with greater cooling capacity on the mold side, to be able to set the article as fast as possible.

Traditionally, the cooling of the molds was carried out by passing the air under pressure through the frame of the machine, which was directed towards the mold holding clamps. However, it required a larger volume, a higher pressure and, consequently, an air flow large enough to cool the molds.

Notwithstanding the above, the problem with this type of cooling was that the dissipation of heat in the mold was not uniform and therefore, it was not either in the newly formed glass container. It is known that there are regions of the container that have higher temperature requirements for an ideal distribution of the glass during the preforming or blowing of the container that limit the quality of production. Once on the mold side, what is required is the maximum possible flow of air to cool the mold and/or set in the minimum time the article, to increase the speed of production.

Therefore, because there are currently machines with higher speed, it is required that the molds are cooled more quickly, in order to satisfy the production demand.

Several developments arose for the cooling of the molds. U.S. Pat. Nos. 1,875,202; 3,355,277; 4,251,253 and 4,502,879, which are related to providing a plurality of axial passages in the body of the mold halves and the introduction of an air flow through said passages from the bottom or by the top of the mold.

However, some of these mold cooling systems maintain a gradual accumulation of heat, because the cooling systems only perform the cooling action when the molds are closed. In other cooling systems, molds can also be cooled during the 360° cycle, but the efficiency with which this cooling is done requires high air pressures, due to the excessive losses in the system, increasing the cost of manufacturing a container.

On the other hand, within the glassware manufacturing process, it is important to consider that the temperature control of the blank or parison side (parison forming mold) is very different from that of the mold side (final container shape).

Some systems have focused on the cooling of the blank or parison mold, such as the one illustrated in the U.S. Pat. No. 4,701,203 by Wilhelm Schneider, which refers to a cooling system for a forming tool of a machine for forming molten glass or other thermoplastic materials, wherein the forming tool is coolable by a pressure fluid and turnable about a first pivoting axle, includes at least one stationary supply conduit having an outlet opening, a pressure distributing device for the forming tool turnable relative to said supply conduit about the first pivoting axle, and a connecting conduit arranged to connect each supply conduit with the pressure fluid distributing device and having an articulated conduit component turnable about a second pivoting axle which is fixed relative to the pressure fluid distributing device and is parallel to the first pivoting axle, the articulated conduit component having an inlet opening which is in a constant communication with the outlet opening of the supply conduit, the articulated conduit component being displaceable relative to the supply conduit in a displacement plane normal to the pivoting axles.

However, one of the principles that has been handled is that, in the parison forming, the temperature control must be very precise, that is, it is very important to maintain the isotherms of the blank or parison mold to maintain an ideal thickness distribution for the entire container. Any variation of temperature in the mold implies that, if some sections are colder, the glass will be thicker in those parts and, if it is hotter, it will become thinner. Excessive temperatures in any region make the parison not rigid enough for its transference and deposit on the mold side so the preforming can be deformed and get out of control.

As for the mold side, temperature control is not very important, since the greatest possible cooling is required. The faster the mold cools, the faster the container sets when it is in contact with the mold and, therefore, the mold is opened faster to extract the article already set.

Some developments that have focused on cooling the mold side are, for example, European Patent No. EP0612699 by Richard Kirkman, which refers to a mold cooling apparatus comprising a pair of complementary mold arms, each arm supporting mold halves such that when the arms are moved toward one another the molds halves form plural cavities. Each mold arm supports a first air chamber to which air under pressure is supplied and a second air chamber communicating with the first chamber and having an opening facing substantially the entire length of each mold half. A diffuser plate closes each second chamber and is positioned in close proximity with its respective mold half. The diffuser plate has openings for directing air from the second chamber against the mold half. Each mold half has axial exhaust openings extending from the space between the mold half and the exterior. The mold cooling apparatus can be applied to individual cavity as well as multi-cavity mold equipment. When a multi-cavity configuration is used, supplemental cooling is utilized through introduction of compressed air from a secondary source to axial and interconnected passages within the mold halves.

Another development on the mold side is illustrated in the U.S. Pat. No. 8,316,670 of Daniel Newson et al, which describes a glassware forming machine includes a machine section box having a cooling air outlet opening, at least one mold-carrying arm disposed above the section box and movable between mold-open and mold-closed positions, and means for delivering cooling air from the outlet opening to the mold arms. The machine in accordance with this aspect of the disclosure is characterized in that the means for delivering cooling air includes a valve plate mounted on the section box to pivot around an axis and having a valve plate opening that registers with the outlet opening in the section box. A pressure plate is mounted on the mold-carrying arm overlying the valve plate and has a pressure plate opening that registers with the valve plate opening. A coupling between the valve plate and the pressure plate pivots the valve plate on the section box as a function of motion of the mold-carrying arm between the mold-open and mold-closed positions such that cooling air is continuously fed to the mold-carrying arm through the valve plate and the pressure plate. The coupling preferably is a lost motion coupling such that motion of the mold arm is not imparted to the valve plate during initial motion in either the opening or the closing direction.

Even though there are some other mold cooling systems, most are focused particularly towards the blank or parison side or the mold side.

Another disadvantage of the known cooling systems is that, whenever it is necessary to change the molds, for the production of the different sizes of containers, it is necessary to adapt the equipment to adjust the blank or parison reversal center. That is, the cooling equipment has to be changed to suit a larger or smaller glass preform and therefore, it has to be assembled and/or disassembled with other different parts to fit to the reversal center of the new blank or parison mold. All this implies changes and movements for each product, so the equipment for each of them results in a high cost.

OBJECTIVES OF THE INVENTION

Considering the foregoing, the present invention relates to a mold cooling method and system for a glass container forming machine, which is adaptable for the cooling of both parison molds and blowing molds, and which can be used for cooling continuously during the container forming cycle (360°) or can supply the cooling air in a programmed manner according to the needs of the process.

Another advantage of the mold cooling method and system for a glass container forming machine of the aforesaid invention is that it only requires a mold clamp, an insert mold holder and a mold, avoiding individual boxes to supply the air and to direct the air towards the blank or parison mold and to the final blowing mold.

An additional advantage of the mold cooling method and system for a glass container forming machine is that it can be used both in press-blow narrow mouth (PSBA), press and blow (PS) or blow and blow (SS) processes.

There is yet another additional advantage of the mold cooling method and system for a glass container forming machine which is capable of cooling such molds both in their open and closed positions, which is providing a flow of cooling air through a plurality of axial cooling passages, in such molds, in order to improve the heat transfer of the molds.

Another advantage of the mold cooling method and system for a glass container forming machine is that it decreases the equipment, allowing to make faster changes of molding and have greater versatility in terms of changing the reversal centers of the preform.

A further advantage of the mold cooling method and system for a glass container forming machine is that it can be adjustable according to the height of the blank or parison mold or the final blow mold.

An additional advantage of the mold cooling method and system for a glass container forming machine is that it transfers the air directly from a plenum chamber of the structure of the forming machine to the molds.

An advantage of the mold cooling method and system for a glass container forming machine that it is easily adaptable to different systems of cavities, for example, from quadruple to triple cavities, quadruple to double cavities, triple to double cavities, etc.

Another advantage of the mold cooling method and system for a glass container forming machine, is that it is easy to change and reduces maintenance cost.

It is a further advantage of the mold cooling method and system for a glass container forming machine, in which all the weight of the blank or parison mold or final blowing mold, as well as, of cooling boxes, is supported by the structure of the piston mechanism or the structure of the bottom mechanism, avoiding the deterioration of the jaws of the clamps by the direct support of the molds.

A final advantage of the mold cooling method and system for a glass container forming machine in is that, since the jaw no longer receives so much load (for supporting molds and boxes), the useful life of the same increases.

In summary, the advantages of the mold cooling method and system for a glass container forming machine, according to the foregoing invention, are as follows:

It is suitable for the production of hollow glassware, such as bottles, jars, glasses and other glass articles, by means of the blow-blow, press-blow or narrow-mouth blow press processes, in a glassware forming machine of the type including multiple machine sections and multiple cavities.

The system can be adjusted quickly in a multi-section machine, without the need for expensive equipment to be operated or for maintenance, repair and/or update.

These and other objects and advantages of the present invention will become apparent to those of ordinary skill in the field of the following description of a specific embodiment of the invention, provided in combination with the accompanying drawings.

DETAILED DESCRIPTION OF THE INVENTION

The invention will be described below in relation to a specific embodiment of a structure of a glassware forming machine of the type of individual sections (I.S.) where the same parts will be referred to with the same numbers.

According to FIGS. 1 to 11, a parison forming station 10, of a glassware forming machine is shown. It is important to note that in the manufacture of glass, the individual sections of the machine include a parison or blank forming structure and a final blowing structure. These processes can be press-blow narrow mouth, press-blow or blow-blow. According to the embodiment illustrated in FIGS. 1 and 2, reference will only be made to the parison structure but, the same components and concepts are applicable to the blowing station.

Figure 1:
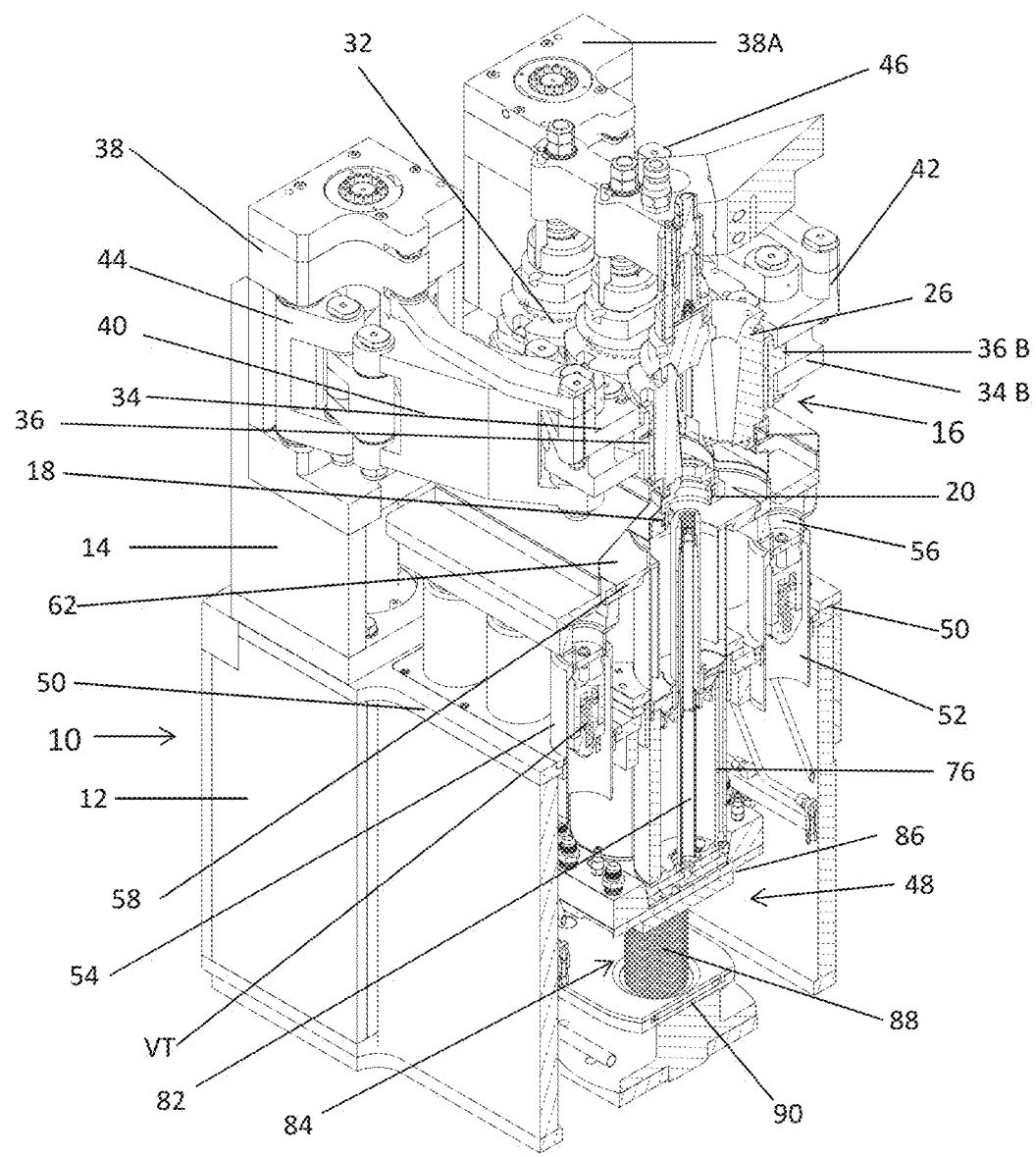
FIG. 1 is a conventional perspective sectional view of an individual forming station of a glass forming machine, illustrating a detailed structure of the cooling system of the present invention.
Figure 2:
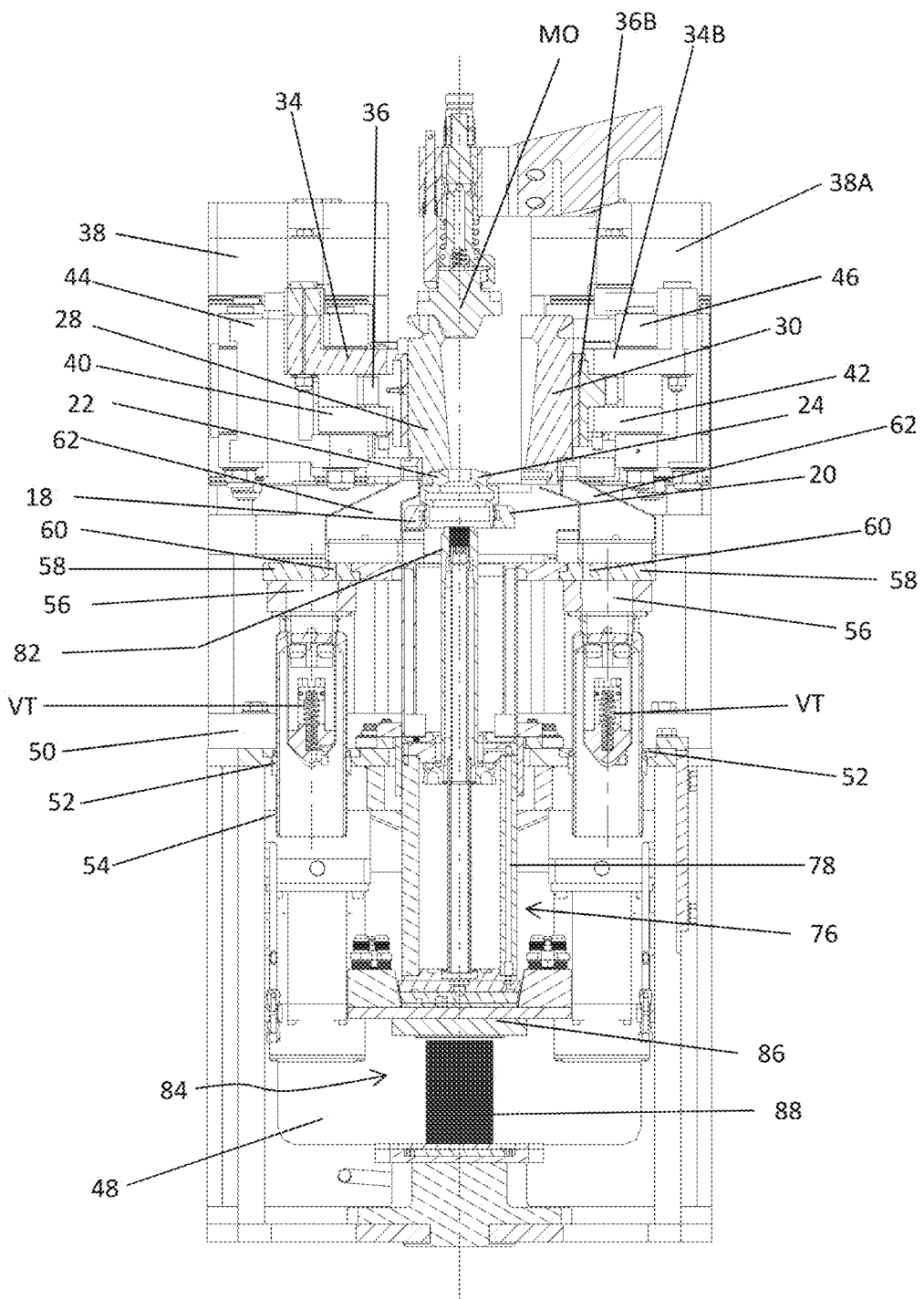
FIG. 2 is a front sectional view, taken from FIG. 1, showing in detail the cooling system of the present invention.
Figure 3:
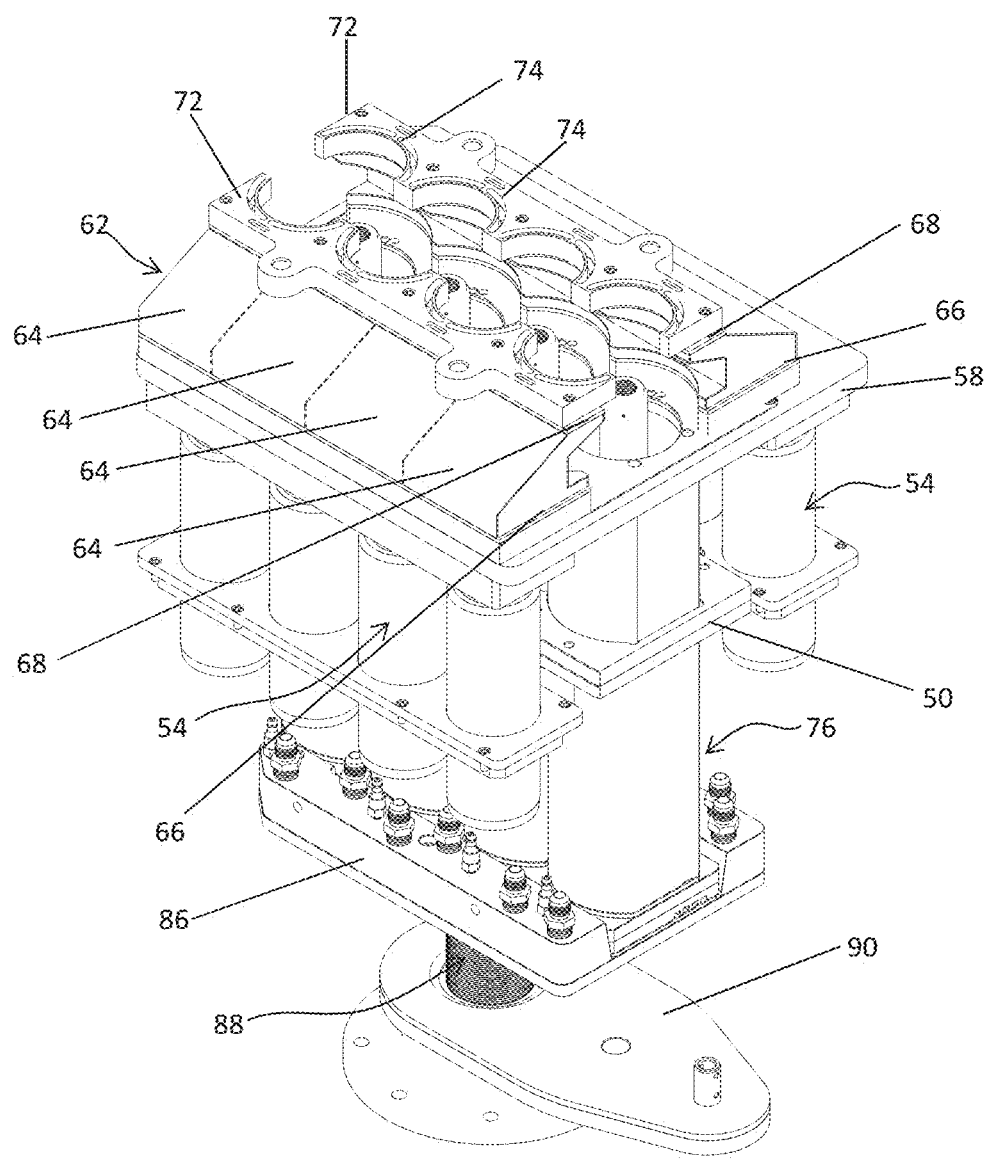
FIG. 3 is a conventional perspective view of the cooling system module of the present invention.
Figure 4:
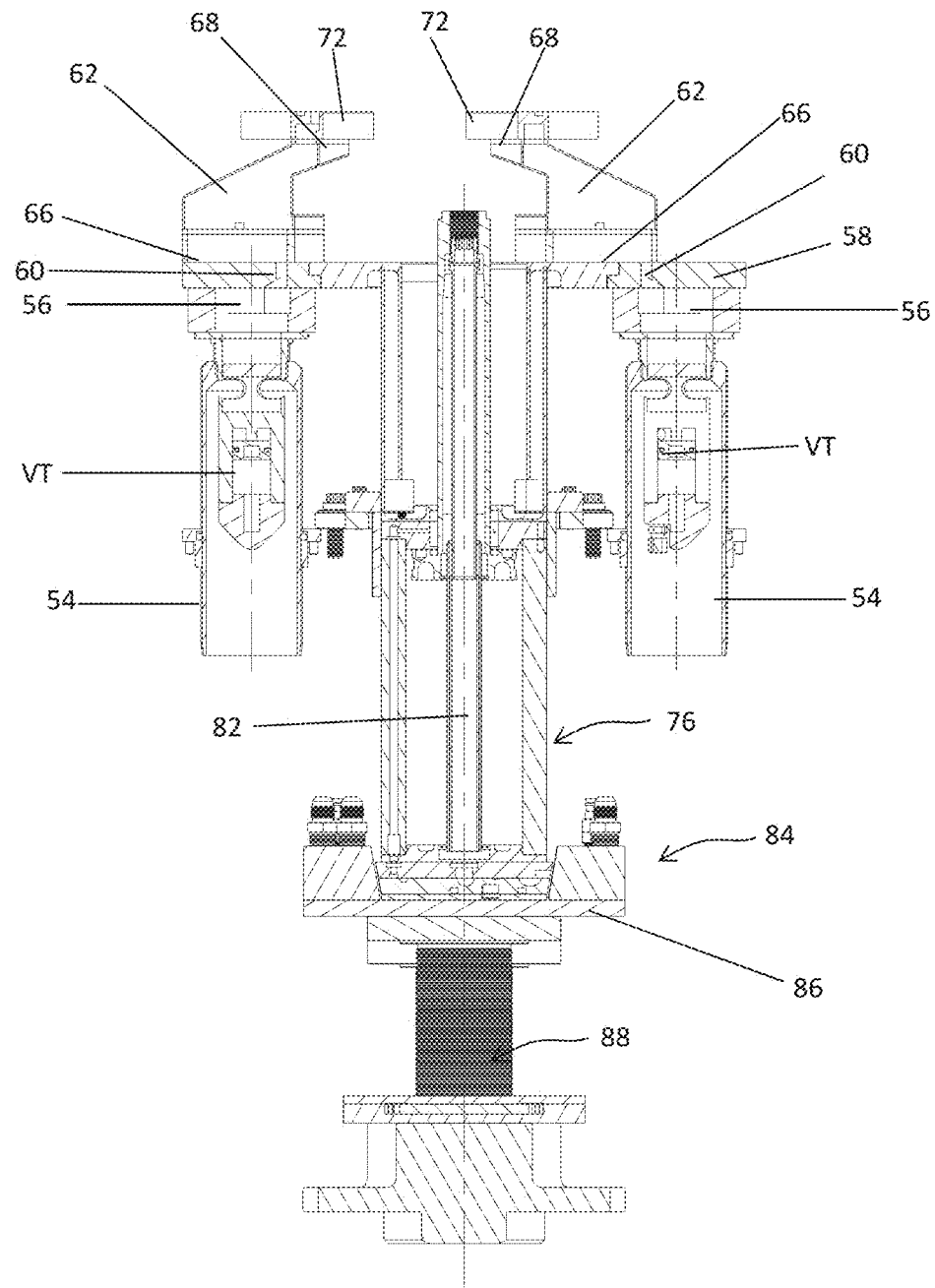
FIG. 4 is a front view of the module of FIG. 3, showing the cooling system module of the present invention.
Figure 5:
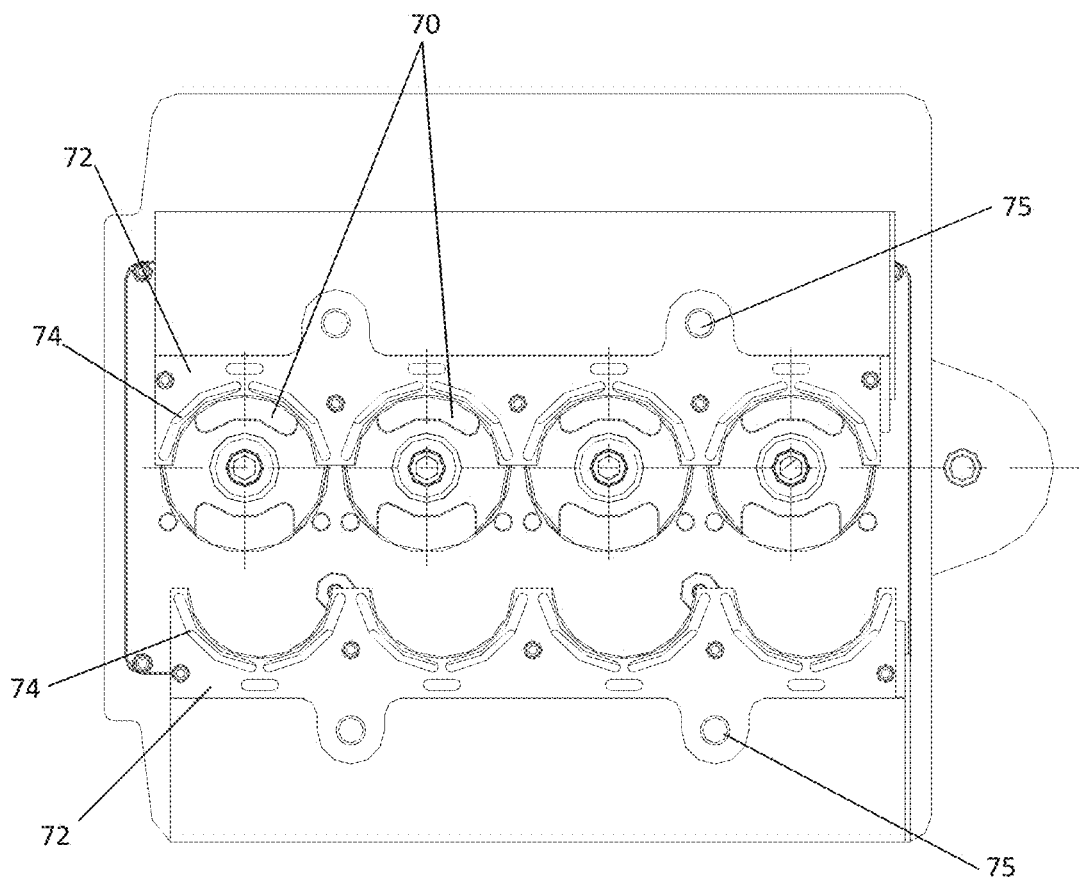
FIG. 5 is a plan view, showing the upper part of the cooling system module of the present invention, illustrated in FIG. 3.

In FIGS. 1 and 2 a machine supporting frame 12 is shown; a mechanism support frame 14 mounted on the machine supporting frame 12, for mounting the various mechanisms of the machine; a parison forming station 16 comprising, as illustrated in FIG. 1, a first transferable and open-able crown mold 18, per cavity, and a second transferable and open-able crown mold 20, per cavity, each one having two crown mold halves 22, 24, (FIG. 2) assembled opposite face to face, defining a crown forming cavity of the container (not shown); a blank or parison mold 26 for each cavity, to form a parison P (illustrated in FIGS. 6 and 7), once a gob of molten glass has been fed into it and a baffle mechanism MO has been positioned thereon (FIG. 2); said blank or parison mold 26 is formed by two similar blank or parison mold halves 28, 30 (FIG. 2), each having a parison forming cavity P, and cooling means represented by axial passages 32, for cooling the mold halves of the blank or parison 28, 30; and mounting means, represented by retaining sections 34, 34B, to be mounted to a blank or parison mold retainer mechanism 36, 36B, mounted on the mechanism support frame 14.

The blank or parison mold retaining mechanism 36, as illustrated in FIGS. 1 to 2, comprises: mounting means, represented by a mounting element 38, 38A, mounted on the mechanism support frame 14; a first and second arms 40, 42, mounted to pivot in the mounting bracket 44, 46 in an articulated arrangement, which includes the mold retaining mechanism of the blank or parison 36, 36B, in which each of the halves of parison or blank mold 28, 30, by means of the retaining sections 34, 34B, so that the blank or parison mold halves 28, 30, can be opened and closed by opening and closing the arms 40, 42, to form the parison P.

Figure 6:
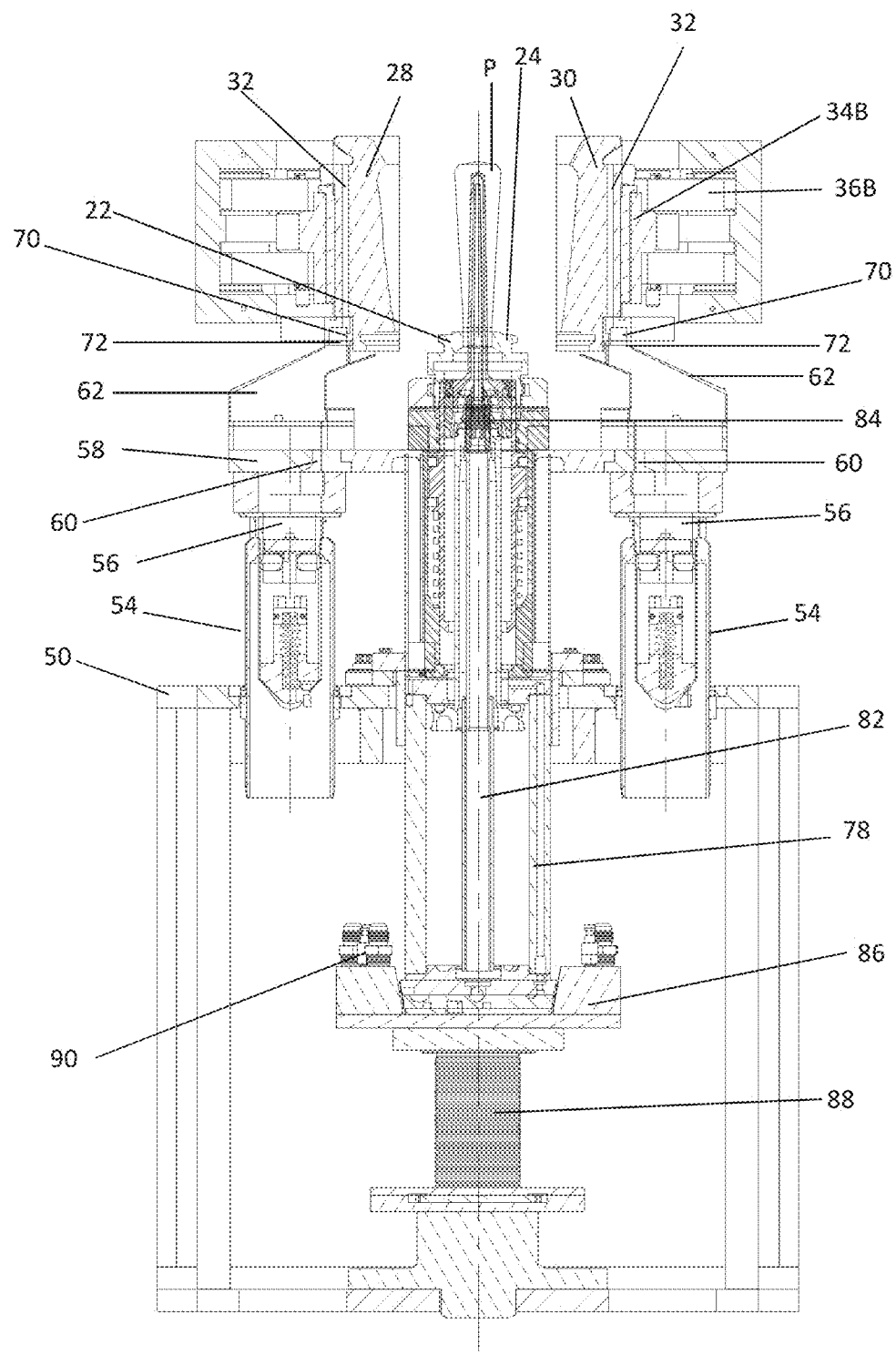
FIG. 6 is a schematic view, in frontal section, of the blank or parison side, showing the cooling system with an open blank or parison mold.
Figure 6A:
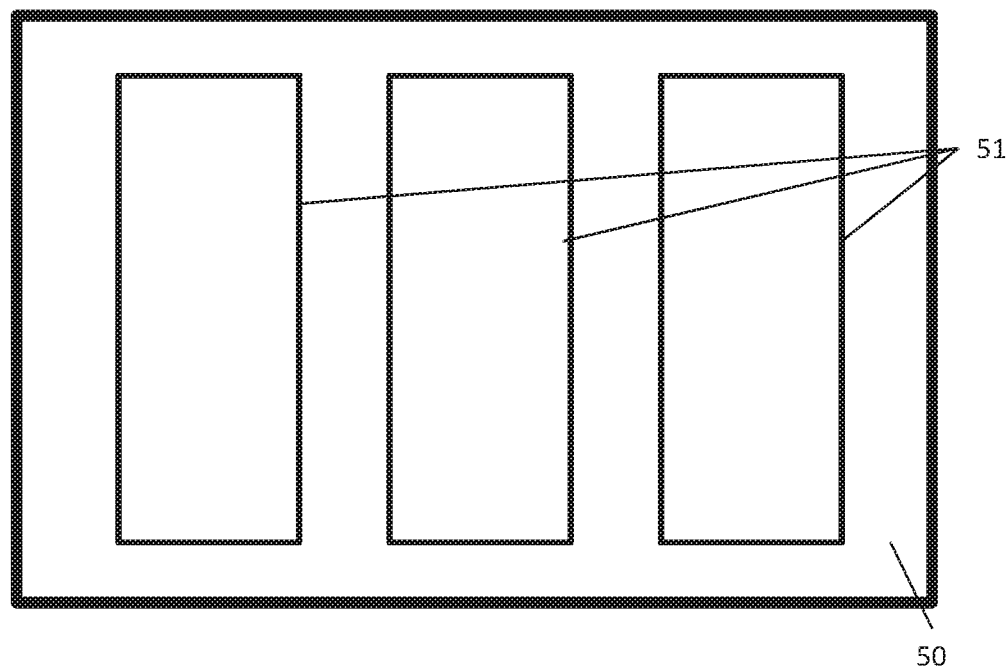
FIGS. 6A and 6B show schematically in a plan view, the upper plate of a plenum box, to stabilize the pressure and cooling flow, which is located in the frame of the machine structure shown in the FIGS. 1 and 2.
Figure 6B:
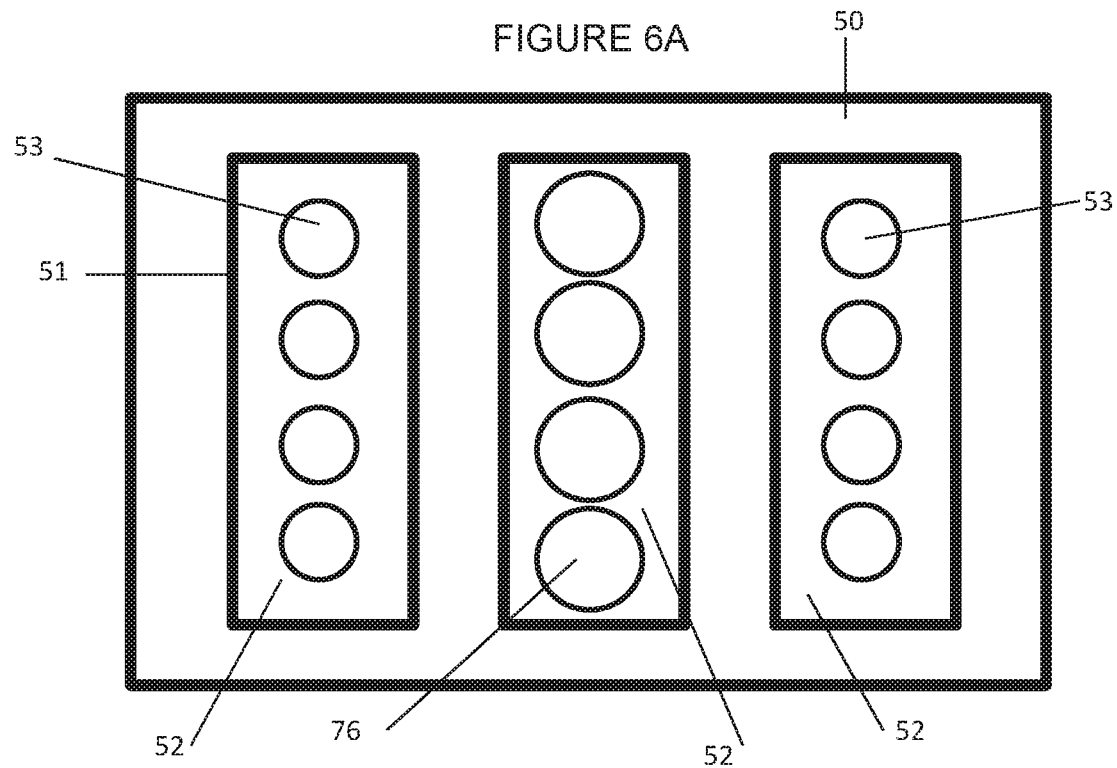
Figure 7:
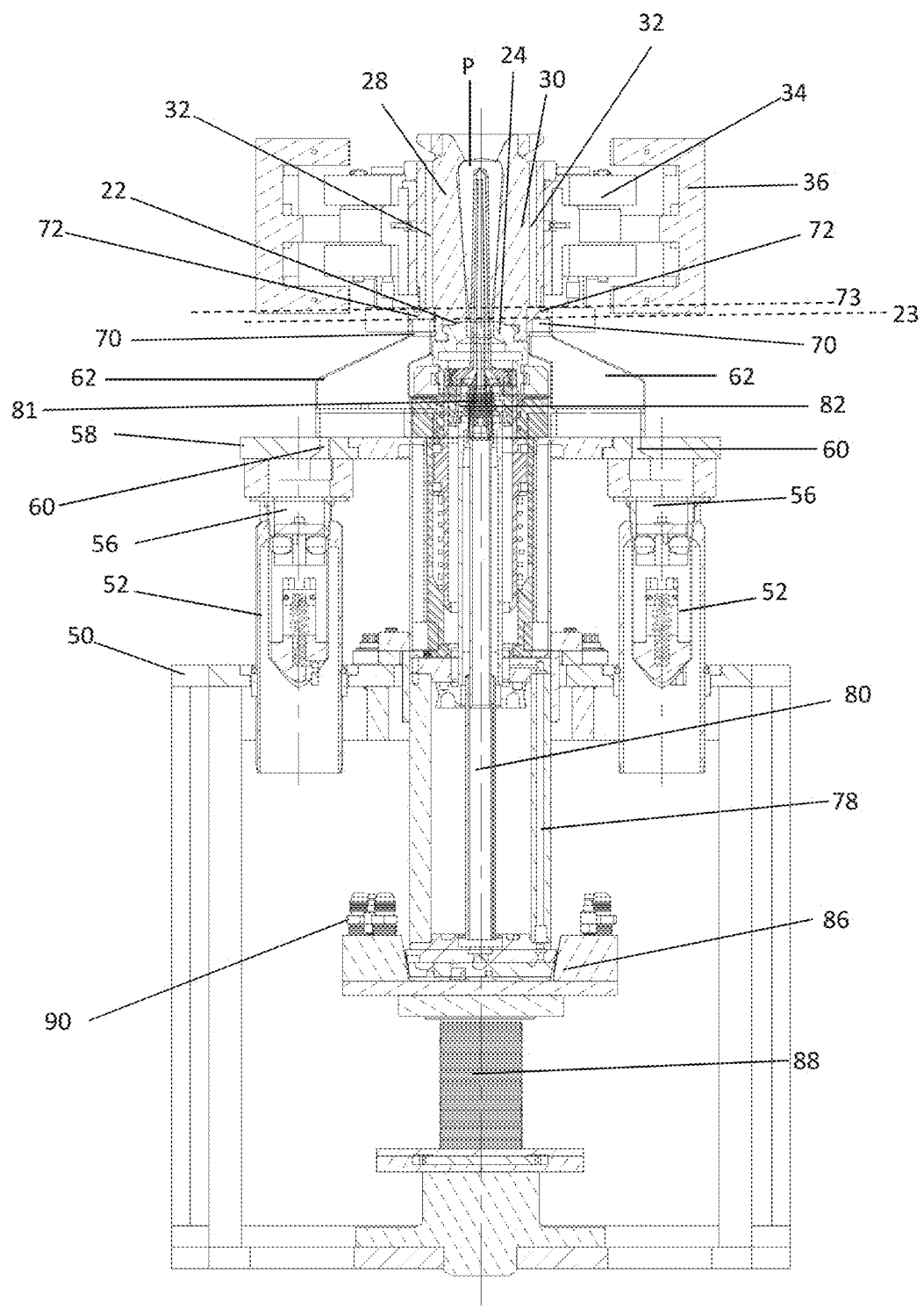
FIG. 7 is a schematic view, in a front section, of the blank or parison side, showing the cooling system with a closed blank or parison mold.
Figure 8:
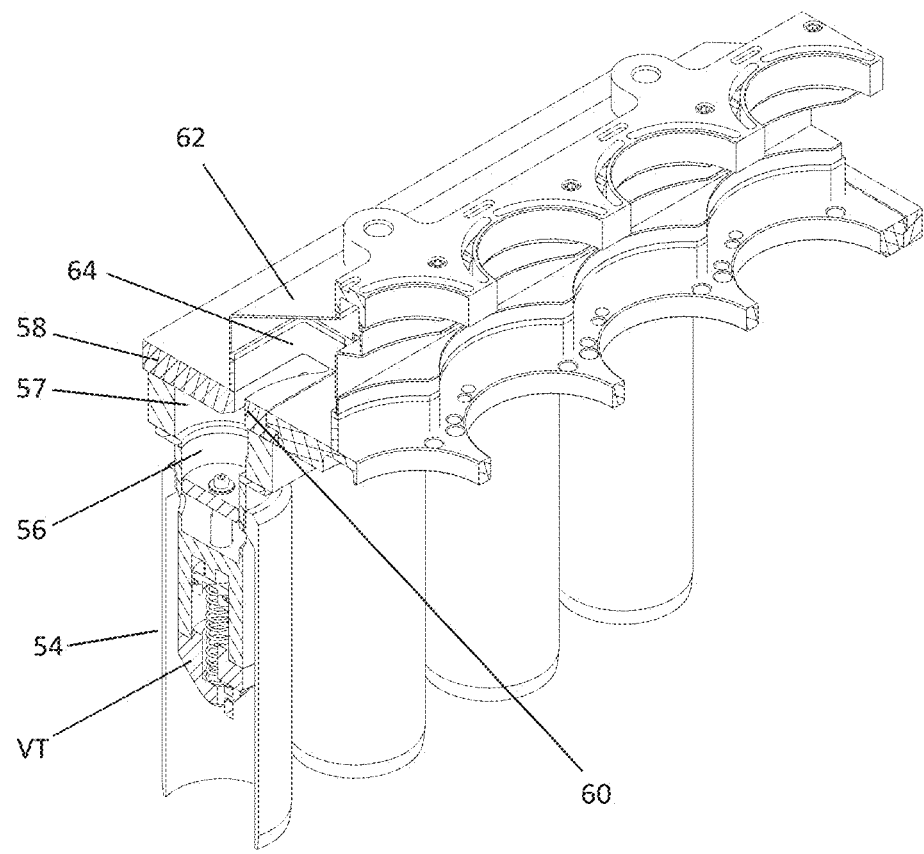
FIG. 8 is a conventional perspective view of a detailed structure of a primary distributor with an independent chamber.
Figure 9:
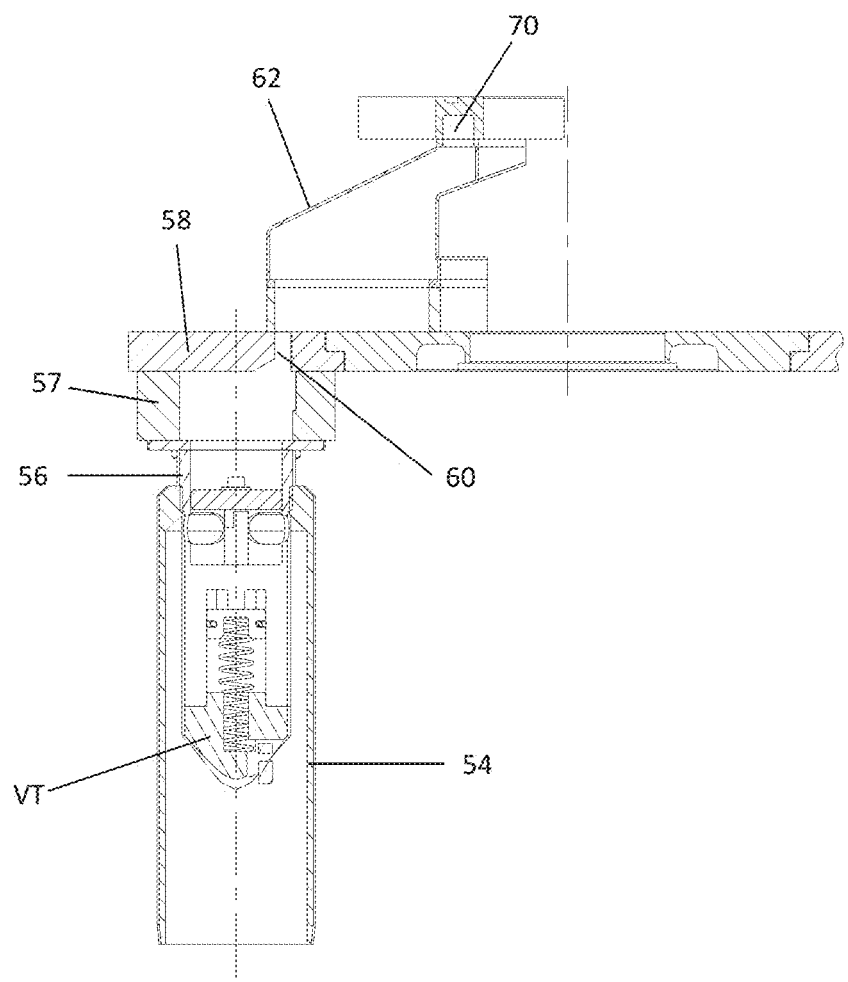
FIG. 9 is a side view, taken from FIG. 8, showing in detail the primary distributor with independent chamber.
Figure 10:
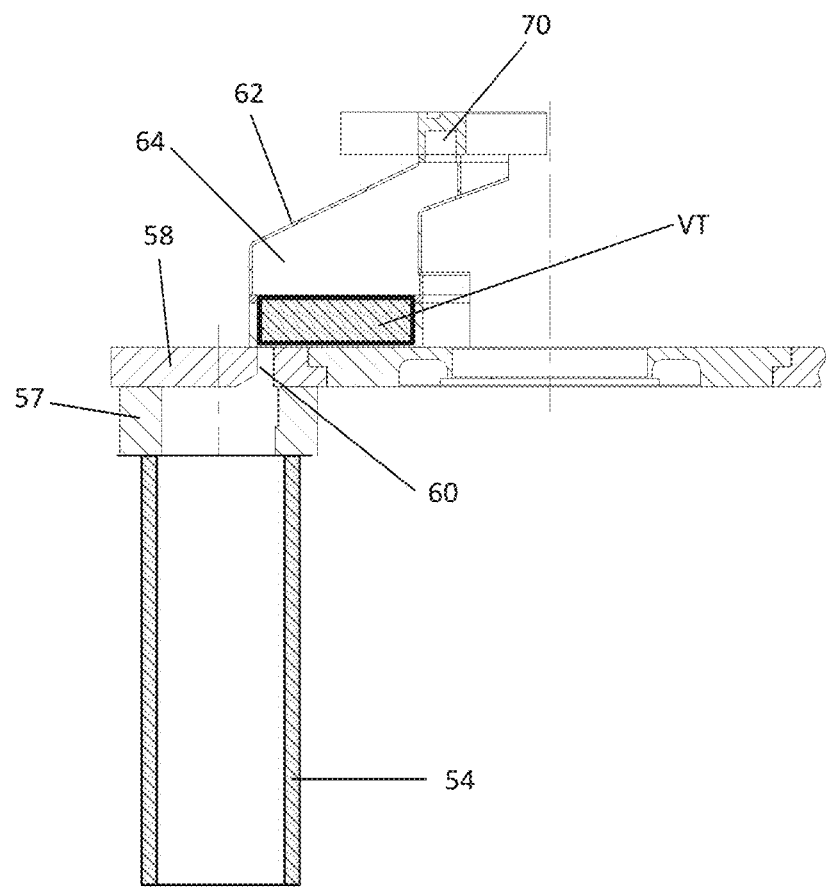
FIG. 10 is a side view, similar to FIG. 8, showing in detail a second embodiment of the primary distributor with independent chamber; and, FIG. 11 is a view is a schematic view, in a front section, showing the cooling system for the mold side.

Making particular reference to the parison or final blowing mold cooling system, the machine supporting frame 12 comprises: a plenum box 48 for providing a pressurized cooling air to each of the halves of blank or parison molds 28, 30, as will be described later. The plenum box 48 having a first top plate 50 with longitudinal openings 51 (FIG. 6A), said first top plate 50 being screwed into the upper part of machine supporting frame 12, to seal the plenum chamber 48. A longitudinal plate 52 (FIG. 6B) for each longitudinal opening 51, each longitudinal plate 52 including a series of holes 53, aligned with each other, for mounting at least one cooling duct 54 for each of the blank or parison mold halves 28, 30. The central longitudinal plate 52 being prepared to receive a cylinder-piston assembly 76 as it will be described later. Said cooling ducts 54 being aligned to and in coincident relation to a cooling chamber 62, said cooling chamber 62 having hollow individual chambers 64 (FIG. 3), as it will be described later. By each longitudinal opening 51 a die carrier plate is located (not shown), which in turn is aligned with the cooling ducts 54. Each cooling duct 54 having an upper end 56 that functions as a transition chamber of the cooling duct 54, for the air outlet to each of the hollow individual chambers 64, which may be in single, double, triple or quadruple versions.

Cooling ducts 54 include timer valves VT, with high cooling air flow efficiency, to control the flow of pressurized cooling air that is coming from the plenum box 48. These programmable timer valves VT being to regulate the flow of the pressurized cooling air in a continuous or intermittent manner, depending on what is required in the blank or parison side or in the mold side. Said cooling ducts 54 being displaceable through each one of the holes 53 of the longitudinal plate 52, which is engaged in each longitudinal opening 51 of the upper plate 50, with an upward or downward movement, depending on the reversal center required for the blank or parison mold or final blow mold.

A second top plate 58 is disposed above the first top plate 50, said second top plate 58 having outlet ports 60 for placement and coinciding with each outlet end 56 of each cooling duct 54.

A cooling air distribution chamber 62 (FIGS. 3 and 4) is disposed above the second upper plate 58, said cooling air distribution chamber 62 being divided into hollow individual chambers 64 according to the number of halves of each blank or parison mold 28, 30, or final blowing mold (not shown). Each of the hollow individual chambers 64 of said cooling chamber 62, having a lower frame or wear plate 66 being coincident with the outlet ports 60 of the second top plate 58 and the outlet end 56 of each cooling duct 54. The upper part 68 of the cooling chamber 62 includes air outlet openings 70 (FIGS. 5, 6, 6A and 7) for the exit of the cooling air to each of the mold halves 28, 30. A support plate or anvil 72 (FIG. 5) is placed by the top 68 of the cooling chamber 62, coinciding with each of the air outlet openings 70. The support plate or anvil 72, has semicircular openings 74 to coincide with each of the axial passages 32 of each half of the blank or parison mold 28, 30, to direct the pressurized cooling air to each of the halves of the blank or parison 28, 30, or final blowing mold (not shown).

The cooling air distribution chamber 62 which is located on the second upper plate 58, is coupled at one end to the lower structure of each mold half 28, 30, and at its other end, by means of a drive pin 75 positioned respectively in each of the arms 40, 42, in such a way that the cooling air distribution chamber 62 moves together with the opening and closing of the arms 40, 42, and of the parison molds 28, 30.

It is important to note that the cooling air distribution chamber 62, during its displacement on the lower frame or wear plate 66 does not generate friction directly, since it uses the "air bearing" principle, the which is specially designed to reduce wear between both components. Depending on the movement of the arms 40, 42, the cooling air distribution chamber 62 can be displaced with an arcuate, parallel or semi-parallel movement. The adjustment of the air cushion is made by means of the drive pin 75.

Although it has been described that each of the blank or parison mold halves 28, 30, are retained by means of a blank or parison mold retainer mechanism 36, the entire weight of the final blow mold or mold, as well as, the cooling air distribution chamber 62, are supported by the structure of the piston mechanism or the structure of the bottom mechanism, avoiding the deterioration of the support arms 40, 42, by the direct support of the molds. The support of each half of the molding on the cooling air distribution chambers 62, keeps the halves of the parison mold or mold in perfect alignment of height, facilitating the assembly with crown or with bottom. The lower part of the halves 28, 30, of the parison mold 26, rest on the bearing surface 73 of the support plate or anvil 72 (FIG. 7) maintaining a tolerance with respect to the height of the line 23 of the crown 22. Any height of the cooling air distribution chamber 62, with the height of the line 23 of the crown 22, with closed mold, must be in coincidence.

In a second embodiment of the present invention, the upper end 56 of each cooling duct 54 includes a primary distributor 57 (FIGS. 8 and 9), with separate chambers, which functions as a transition chamber between each cooling duct 54 and each one of the individual hollow chambers 64 of the cooling air distribution chamber 62.

In a further embodiment of the present invention, the timer valves VT, to control the flow of the pressurized cooling air coming from the plenum box 48, are placed in the inside of each of the individual hollow chambers 64 of the cooling air distribution chamber 62, to control the flow of the pressurized cooling air in a continuous or intermittent manner, depending on what is required on the blank or parison side or on the mold side.

Finally, this type of arrangement is adaptable for the cooling of both parison molds and blowing molds, and that can be used for continuous cooling during the forming cycle of the container (360°) or can supply the cooling air in a programmed manner according to the needs of the process.

As illustrated in FIGS. 1 and 2, the parison forming station 16 includes a cylinder-piston assembly 76, comprising a cylinder 78 retained vertically by the second top plate 58, said second top plate 58 having an opening 80 for allow upward or downward movement of a piston rod 82. The upper part of the piston rod 82 includes a floating guide 84 (FIG. 6) having a conical upper end to be centered with respect to the crown mold halves 22, 24, during the forming of the crown of the container.

The cylinder-piston assembly 76 is coupled to a lifting mechanism 84, which allows adjusting its height according to the size of the molds, that is, to accommodate to a larger or smaller mold, maintaining or selecting a new center of inversion of the preform, for example between a range of 1¾ inch to 7¼ inches and/or maintaining the center of mass of rotation. Each of the cylinder-piston assemblies 76 is supported by a support base 86, which has a micrometric height adjusting screw 88 engaged in the lower part of the frame of the plenum chamber 48 of the machine supporting frame 12. And a gear system or adjustment lever 90 for adjusting the height of the cylinder-piston assembly 76 by means of the screw 88 or by means of a motorized system (not shown).

Because the cylinder-piston assembly 76 and each cooling tube 54, are coupled to the second upper plate 58, the adjustment movement upwards or downwards of the cylinder-piston assembly 76, also allows the simultaneous adjustment of each cooling tube 54 and, consequently, also the height adjustment of the cooling air distribution chamber 62. The adjustment of the height of the cooling air distribution chamber 62 will depend on the height of each mold.

In accordance with the present invention, the forming process of the preform or parison P is performed once the crown mold halves 22, 24, and then have been placed and subsequently the halves of the blank or parison mold 28, 30 are closed, and the glass gob falls inside the blank or parison mold. The upper part of the piston rod 80 including a molding piston holder (not shown) that is placed in a loading position for forming the crown of the container (not shown) and then has an upward movement to allow pressing for the formation of the parison or preform P.

During the forming of the preform or final blow, the cooling air coming from the box structure 48 located in the bottom of the machine structure 12, is introduced to each of the cooling tubes 54. Depending on the programming of the timer valve VT, the valve will open or close to allow the passage of the cooling air flow. The air flow will be directed to the outlet end 56 of each cooling tube, passing through outlet ports 60 of the second top plate 58, to be delivered to each of the individual hollow chambers 64 of the cooling chamber 62. Finally, the cooling air will be directed to the upper portion 68 of each of the individual hollow chambers 64, passing through its air outlet openings 70. Said air outlet openings 70 being in coincidence with each of the semicircular grooves 74 of the support plate or anvil 72 to finally pass it to each of the axial passages 34 of each half of the parison mold 28, 30, for cooling. Each mold half 28, 30, having a cooling duct 54, with independent control.

As mentioned above, the flow of cooling air can be regulated depending on the type of process, for example, in the case of the narrow mouth blow press (PSBA) process, the blank or parison side requires a more adequate temperature control, which can be programmed through the timer valves VT. The blank or parison mold does not require much cooling, but it is more controlled, including cooling intermittently. In the mold side, it requires the greatest possible cooling. The faster the mold cools, the faster the container will set and, therefore, the mold will open faster to extract it.

Figure 11:
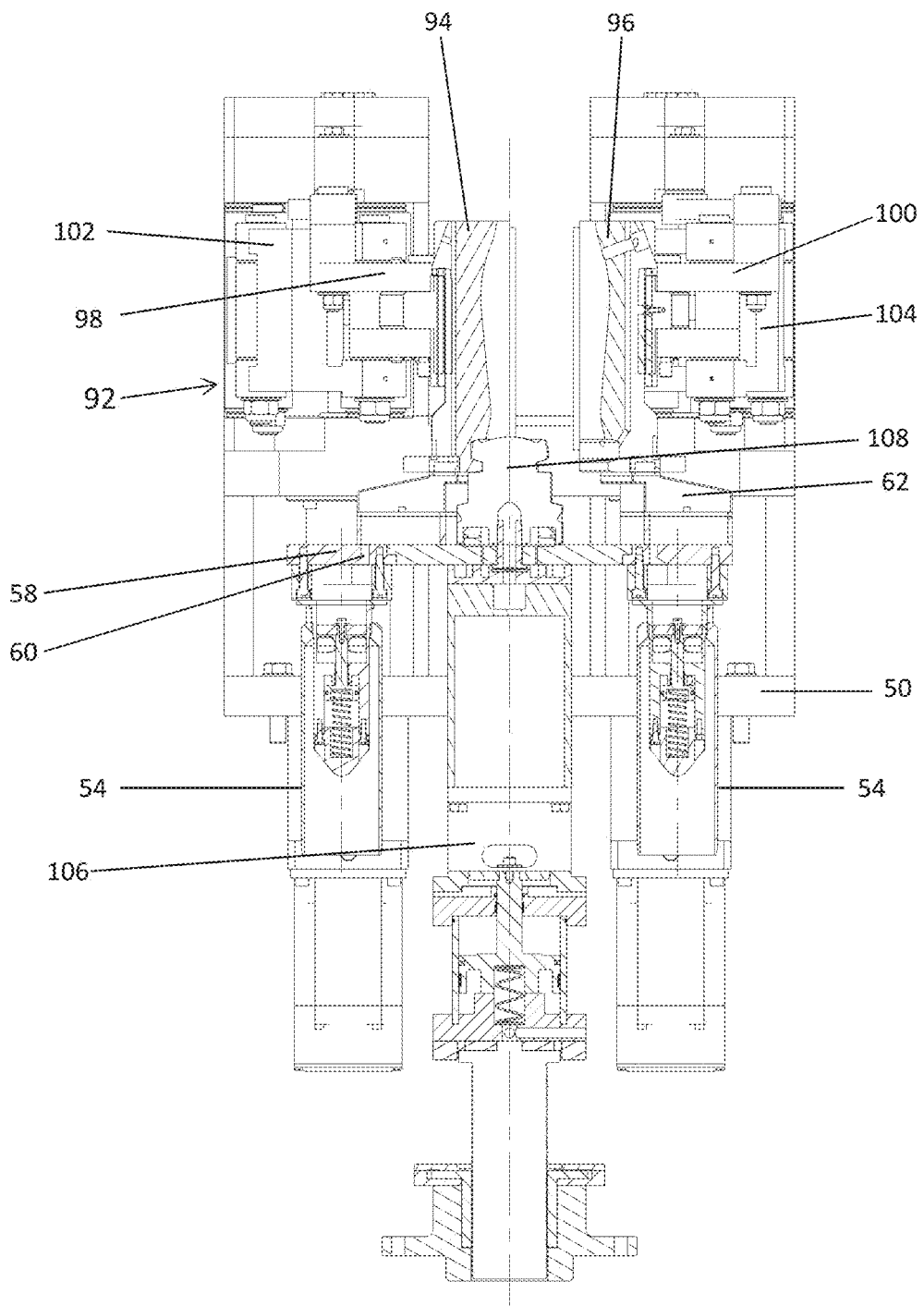

Finally, even though an embodiment for the blank or parison side has been described, this system is also adaptable to the mold side. In FIG. 11 a final blowing station 92 is shown, in an arrangement very similar to that shown in FIG. 2. In this case, a final blow mold including two halves 94, 96, which includes the blow mold retention mechanism 98, 100, so that the blow mold halves 98, 100 can be opened and closed by opening and closing the arms 102, 104, to form the final glass article.

The cooling tubes 54 that are coupled to the second top plate 58. A bottom mechanism 106 is coupled below the top plate 58 to simultaneously raise or lower the cooling tubes 54, and the upper plate 58. The second upper plate 58 has mounted on its upper part, a container bottom mold 108, per cavity, so that when the mold halves 94, 96 are assembled, they define a cavity for the final forming of the container.

As can be seen from above, a system for cooling molds for the production of hollow glassware has been described to be in operation either by the piston mechanism or by the bottom mechanism. Therefore, it will be evident to experts in the field that many other features or improvements can be made, which may be considered within the field determined by the following claims.

The invention claimed is:

1. A mold cooling system for a glass container forming machine, comprising:
   a machine supporting frame;
   a mechanism support frame mounted on the machine supporting frame;
   at least one mold retaining mechanism including mold halves and which is mounted on the mechanism support frame, said mold retaining mechanism and mold halves being movable between a closed mold position for forming a glass article and an open mold position for releasing said glass article, each of the mold halves having axial passages for cooling each of the mold halves, wherein the machine support frame comprises a plenum box for providing a cooling air flow for each of the axial passages of each of the mold halves, the plenum box comprising: a first top plate having a series of holes aligned with each other; and a second series of holes for mounting a cylinder-piston assembly or a bottom mechanism for forming the glass article;

cooling ducts located in each of the first series of holes to slide in the holes with an upward or downward movement;

a second top plate disposed above the first top plate, for fixedly retaining an upper end of each of the cooling ducts, the second top plate having at least an outlet port coinciding in and with the upper end of each cooling duct, to allow passage of the cooling air flow of the plenum box through each of the outlet ports, wherein the second top plate, the cooling ducts, and the cylinder-piston assembly or bottom mechanism are movable together on the first top plate with an upward or downward movement;

a lifting mechanism coupled to the lower part of the cylinder-piston assembly or bottom mechanism to adjust the height of the second top plate, the cylinder-piston assembly or bottom mechanism, and cooling ducts according to the height of each mold half; and, a cooling air distribution chamber for distributing the cooling air flow located above the second top plate, the cooling air distribution chamber having a wear plate in coincident with each of the outlet ports of the second top plate and an outlet end of each cooling duct for the passage of the cooling air flow of the plenum box and, an upper part coinciding with each of the axial passages of each of the mold halves, the cooling air distribution chamber being movable between the closed mold position for forming of the glass article and the open mold position for the release of the glass article, the cooling ducts continuously supplying the cooling air flow through each of the outlet ports to cool the mold halves in any position, from the closed mold position for the formation of the glass article and up to the open mold position for the release of the glass article.

2. The mold cooling system for a glass container forming machine in accordance with claim 1, wherein the cooling air distribution chamber is coupled to the mold retaining mechanism, to move together with the mold retaining mechanism and a pair of arms for opening and closing the mold halves.

3. The mold cooling system for a glass container forming machine in accordance with claim 1, wherein the cooling ducts are located in an internal portion of the plenum box.

4. The mold cooling system for a glass container forming machine in accordance with claim 3, wherein the cooling ducts comprise programmable timer valves (VT) to regulate the passage of the cooling air flow continuously or intermittently to each of the axial passages of each of the mold halves.

5. The mold cooling system for a glass container forming machine in accordance with claim 1, wherein the cooling air distribution chamber comprises programmable timer valves (VT) to regulate the passage of the cooling air flow continuously or intermittently to each of the axial passages of each of the mold halves.

6. The mold cooling system for a glass container forming machine in accordance with claim 1, wherein the cooling air distribution chamber comprises at least one hollow individual chamber, each hollow individual chamber comprising: a wear plate being coincident with the outlet ports of the second top plate for the passage of the cooling air flow; and, at least one air outlet opening for output of the cooling air flow to each of the axial passages of each of the mold halves.

7. The mold cooling system for a glass container forming machine in accordance with claim 6, wherein an upper part of the cooling air distribution chamber comprises a support plate, the support plate comprising semicircular grooves being coincident with the air outlet openings of each of the hollow individual chambers of the cooling air distribution chamber and in coincident with each of the axial passages of each mold half.

8. The mold cooling system for a glass container forming machine in accordance with claim 1, wherein the cooling air distribution chamber is coupled to a bottom portion of the mold retaining mechanism and the mold halves.

9. The mold cooling system for a glass container forming machine in accordance with claim 1, wherein the mold cooling system comprises the cylinder-piston assembly for forming the glass article and the lifting mechanism is coupled to the lower part of the cylinder-piston assembly.

10. The mold cooling system for a glass container forming machine in accordance with claim 1, wherein the mold cooling system comprises the bottom mechanism for forming the glass article and the lifting mechanism is coupled to the lower part of the bottom mechanism.

11. The mold cooling system for a glass container forming machine in accordance with claim 1, wherein each cooling duct comprises a transition chamber positioned at an upper end of each duct.

12. A method for cooling molds of a glassware forming machine comprising the steps of:

providing a glassware forming machine comprising a machine supporting frame and a mold retaining mechanism located on an upper part of the machine supporting frame, the mold retaining mechanism comprising mold halves, the mold halves being movable between a closed mold position for forming a glass article and an open mold position for releasing the glass article, each of the mold halves having axial passages for cooling each of the mold halves of the mold;

passing a cooling air flow from a plenum box formed in the machine supporting frame to cool each of the mold halves, the plenum box comprising: a first top plate having a series of holes aligned with each other; and a second series of holes for mounting a cylinder-piston assembly or a bottom mechanism for forming the glass article;

passing the cooling air flow through cooling ducts, said cooling ducts being coupled by each of the first series of holes to slide with an upward or downward movement; a second top plate is disposed above the first top plate for fixedly retaining an upper end of each of the cooling ducts, said second top plate comprising at least one outlet port coinciding in and with the upper end of each cooling duct to pass the cooling flow of the plenum box through each of the outlet ports, wherein the second top plate, the cooling ducts, and the cylinder-piston assembly or bottom mechanism are displaceable together on the first top plate with an upward or downward movement;

projecting the cooling air flow from the cooling ducts toward a cooling air distribution chamber, the cooling air distribution chamber located above the second top plate and comprising a wear plate being coincident with each of the outlet ports of the second top plate for passage of cooling air flow and an upper part being coincident with each of the axial passages of each of the mold halves; and, distributing the cooling air flow from the cooling air distribution chamber through the series of axial passages of at least one mold half, the cooling air distribution chamber being movable between a closed mold position for forming the glass article and an open mold position for releasing the glass article, said cooling ducts supplying the cooling air flow through each of the outlet ports to cool the mold halves in any position, between the closed mold position for forming the glass article and the open mold position for the release of the glass article.

13. The method for cooling molds of a glassware forming machine as claimed in claim 12, further comprising adjusting the height of the second top plate, the cylinder-piston assembly or bottom mechanism, and the cooling duct with an upward or downward movement according to the height of each mold.

14. The method for cooling molds of a glass article forming machine as claimed in claim 13, wherein the step of adjusting the height of the second top plate, the cylinder-piston assembly, and the cooling ducts with an upward or downward movement according to the height of each mold comprises:
connecting a lifting mechanism in the lower part of the cylinder-piston assembly to simultaneously adjust the height of the cylinder-piston, second top plate and cooling ducts according to the height of each mold.

15. The method for cooling molds of a glass article forming machine as claimed in claim 13, wherein the step of adjusting the height of the second top plate, the bottom mechanism, and the cooling ducts with an upward or downward movement according to the height of each mold comprises:
connecting a lifting mechanism in the lower part of the bottom mechanism to simultaneously adjust the height of the mechanism bottom, second top plate and cooling ducts according to the height of each mold.

16. The method for cooling molds of a glassware forming machine according to claim 12, further comprising continuously or intermittently controlling the cooling air flow in each of the mold halves.

17. The method for cooling molds of a glassware forming machine as claimed in claim 12, further comprising providing a primary distributor with independent chambers between the cooling ducts and the cooling air distribution chamber.

* * * * *